March 20, 1945.  E. A. ROCKWELL  2,372,014

TRAVEL CONTROL ACTUATING APPARATUS

Filed June 13, 1941  5 Sheets-Sheet 2

INVENTOR
Edward A. Rockwell
BY
Arthur Wright
ATTORNEY

March 20, 1945.  E. A. ROCKWELL  2,372,014
TRAVEL CONTROL ACTUATING APPARATUS
Filed June 13, 1941  5 Sheets-Sheet 3

INVENTOR
Edward A. Rockwell
BY
Arthur Wright
ATTORNEY

Patented Mar. 20, 1945

2,372,014

UNITED STATES PATENT OFFICE 2,372,014

TRAVEL CONTROL ACTUATING APPARATUS

Edward A. Rockwell, West Hartford, Conn.

Application June 13, 1941, Serial No. 397,896

19 Claims. (Cl. 60—54.5)

My invention relates particularly to an apparatus designed for actuating the movement of any desired part in such a way as to coordinate the travel of said part with the travel of the means which actuates the same, the same being accomplished by the interposition of a fluid, as for example hydraulic liquid.

The object of my invention is to provide an apparatus of the above character whereby parts to be moved may be effectively operated through the agency of a fluid while coordinating the travel of the part to be moved with the means for moving the same. A further object is to accomplish this by applying any desired modulated pressure at any point in the said movement. Still another object is to accomplish the same by the utilization of a vacuum. One of the objects, furthermore, is to apply the travel control mechanism to the operation of air brake systems, that is to say air brakes operated by the application of compressed air. Further objects of my invention will appear from the detailed description of the same hereinafter.

While my invention is capable of embodiment in many different forms for the purpose of illustration I have shown only certain forms in the accompanying drawings, in which—

Figures 1, 6:
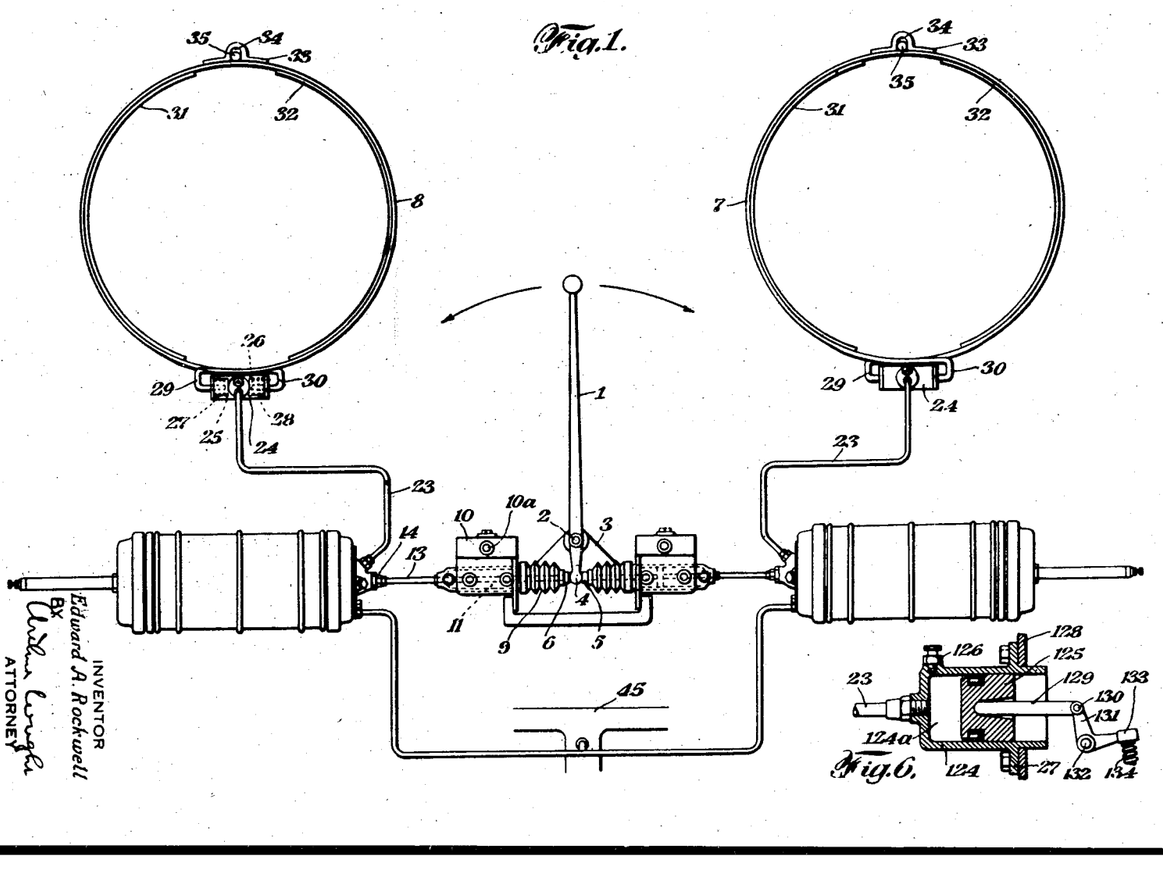
Fig. 1 is a diagrammatic representation of the application of my system for the operation of two alternately operable brakes, as for example on the winches of a hoisting engine.
Fig. 6 is a vertical section of a modified form of a device to be moved by my system, in which a mechanical connection is provided therefrom to any desired part to be moved.
Figure 2:
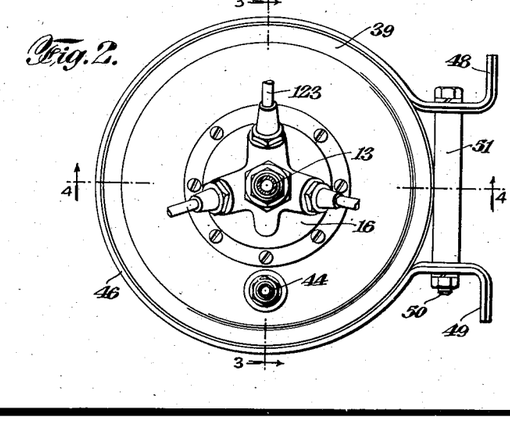
Fig. 2 is an end elevation of one of the power units.

In the drawings, referring first to Fig. 1, I have shown a manual actuating lever 1 carried on a pivot 2 located in any suitable support 3. The lower end of the lever 1 is provided with a rounded portion 4 for operating alternately, as desired, a piston rod 5 or a piston rod 6 leading to the actuation, respectively, of a brake-band 7 on one hoisting engine winch or another brake-band 8 on another winch on the hoisting engine. The parts connecting the piston rod 5 and the brake-band 7 are the same as the parts connecting the piston rod 6 and the brake-band 8 and, accordingly, only one set thereof will be described herein in detail. The piston rod 6 passes through a rubber-boot 9 into a master cylinder 10 of any desired or usual construction, but which may, for example, be constructed like the master cylinder disclosed in the patent to Loughead, No. 1,707,063, granted March 26, 1929, on Pressure mechanism for brake systems, and may be mounted on any desired support by means of three screw holes 10a. This master cylinder, accordingly, may contain a piston 11 connected to the piston rod 5 and operating in a cylinder 12 filled with a hydraulic liquid received from the upper or supply part of the master cylinder 10. The hydraulic liquid thus placed under manual pressure by the lever 1 is conveyed by a flexible pipe 13 to an inlet opening 14 in a pipe fitting 15 screw-threaded into an end casting 16 and sealed therein by an annular rubber seal 17. Initially, this liquid under manual pressure will pass from the inlet opening 14 by a valve seat 18 on the inner end of the fitting 15 and a conical valve 19 seating thereon through flutings 20 which act as guides for a guide member 21 and thence through an outlet port 22 in said casting 16 to a flexible pipe 23 which leads to a brake cylinder 24 having two pistons 25 and 26 returned by springs 27 and 28 respectively. The pistons 25 and 26 are connected, respectively, to U-shaped ends 29 and 30 of the brake-band 8, having brake linings 31 and 32 and having a pivot bracket 33 secured to said band which has a slot 34 containing a pivot pin 35 secured to any desired stationary part of the winch. The liquid thus supplied manually to the brake cylinder 24 will move the brake-band 8 up into position without placing very much pressure on the brake drum (not shown) within the same. At the same time the liquid under manual pressure will pass by a passageway 36 and through a fitting 37 to a pipe 38 which extends longitudinally in a sheet metal power unit housing 39 which is attached to the casting 16 by screws 40. Adjacent to the casting 16 the housing 39 has therein a valve casing 41 containing a check valve 42 cooperating with a valve seat 43 in said casing 41. Said casing 41 is connected by a flexible pipe 44 to an engine manifold 45 on an internal combustion engine for driving two winches (not shown) on which the two brakes are located, or it may be connected to any other suitable source of vacuum. The housing 39 is designed to be supported on any desired fixed support by means of two straps 46 and 47 having supporting ends 48 and 49 for suitable attachment thereto, said straps 46 and 47 being tightened on the housing by means of bolts 50 with intervening sleeves 51.

Figure 3:
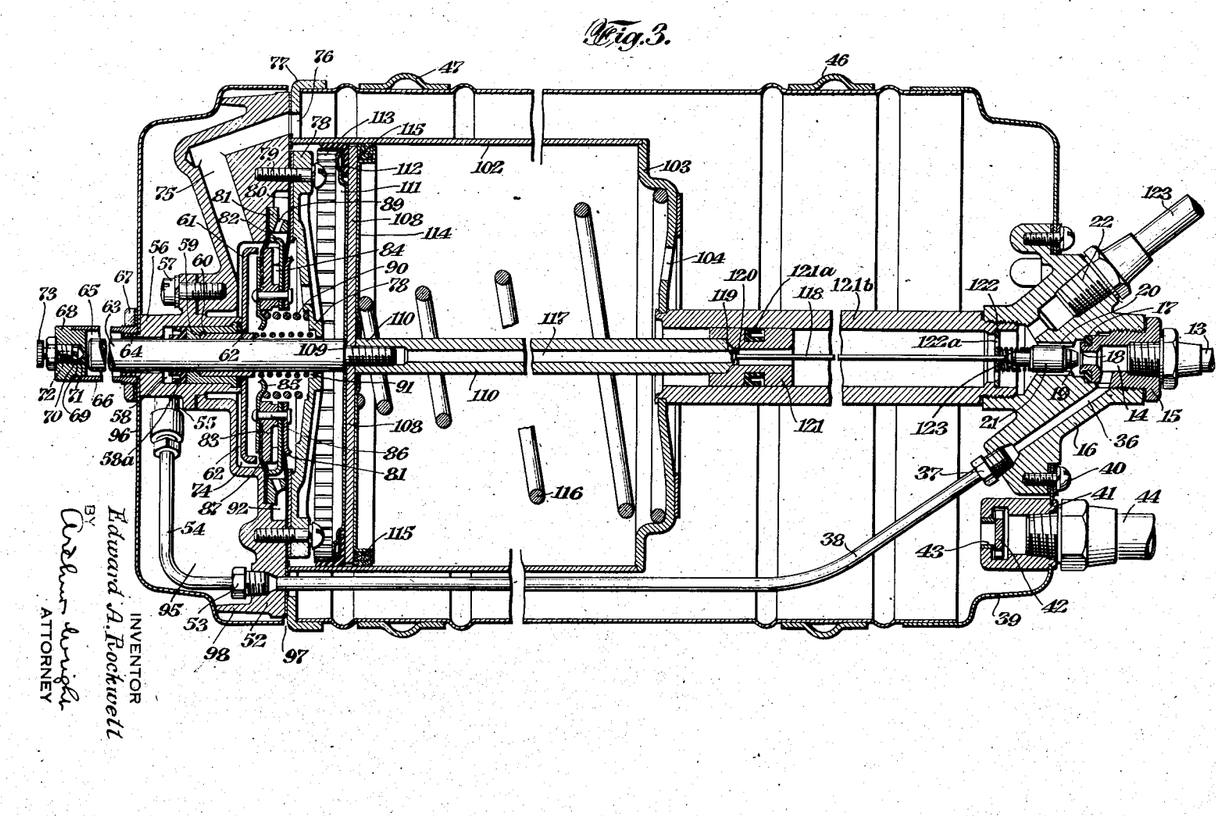
Fig. 3 is a vertical section thereof taken on line 3—3 of Fig. 2.
Figure 4:
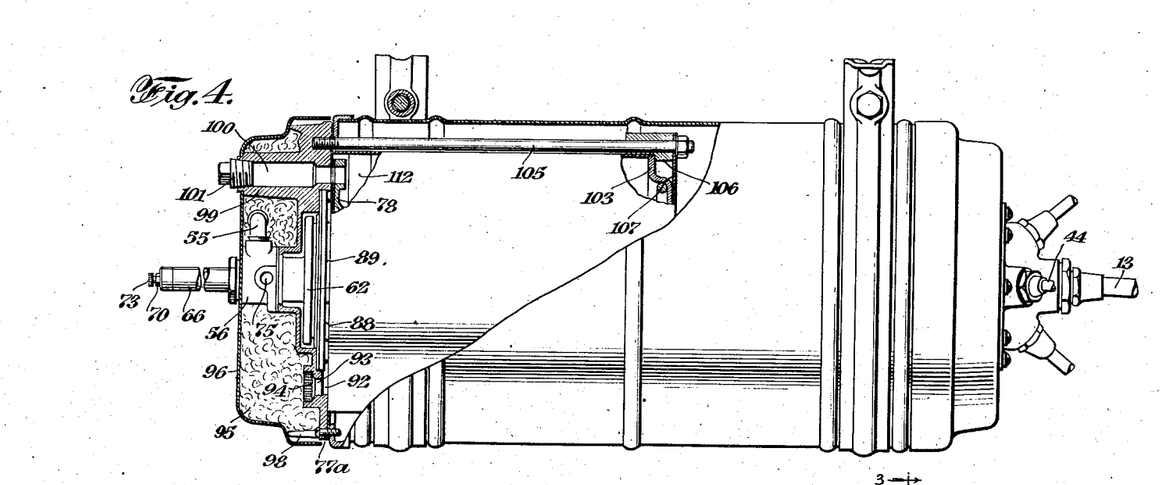
Fig. 4 is a plan view taken partially in cross-section on line 4—4 of Fig. 2.
Figure 5:
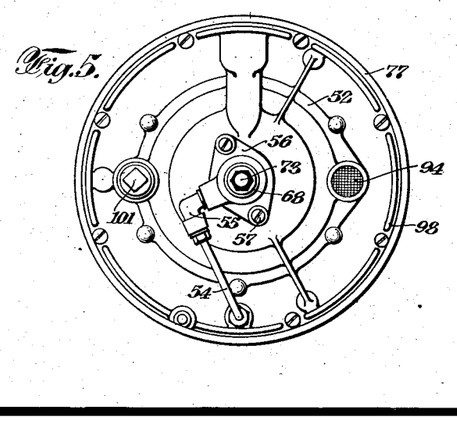
Fig. 5 is an elevation of the other end of said power unit.

The liquid under manual pressure is thus conveyed through the pipe 38, into a casting 52 and thence through a fitting 53 and a pipe 54 to a fitting 55 in a plunger housing 56 which is secured by screws 57 to the casting 52. The liquid under manual pressure is thence conveyed into a plunger chamber 58 having an annular rubber seal 58a and a plunger 59 therein carrying on the interior of the plunger a graphite bronze bushing 60 on which there is secured tightly a dished outlet valve 61. An annular rubber seal 62 is carried between the annular plunger 59 and bushing 60 and the dished valve 61. The said bushing 60 is provided so as to produce a slidable fit on a monitor plunger 63 which extends out through an opening 64 in the plunger housing 56 with an appreciable clearance between the plunger 63 and the plunger housing 56. The said plunger 63 extends, furthermore, into a cylindrical chamber 65 in a tube 66 screw-threaded to the housing 56 on which it is held by a lock-nut 67. The other end of the tube 66 is closed by a plug 68 which has an air relief passageway 69 to communicate with a screw plug 70 having a transverse passageway 71 leading to a longitudinal passageway 72 which is adapted to be closed normally by a removable screw plug 73. By the removal of the plug 73 the accumulated air may be allowed to escape from time to time.

The outlet valve 61 is located in a vacuum chamber 74 in the casting 52, which communicates by a passageway 75 in the casting 52 leading to a port 76 so as to communicate with the interior of the housing 39 by passing through an end ring 77 secured to the end of the housing 39 by screws 77a. A spider 78 is secured by screws 79 to the right face of the casting 52 and so as to hold in place a comparatively then oxidized oil silk diaphragm 80, the inner periphery of which is clamped between a clamping plate 81 and a dished inlet valve 82. The clamping plate 81 and inlet valve 82 are mounted together on a spacing member 83, having radial passageways 84, which in turn is mounted on a retainer plate 85, these parts being connected together by a series of rivets 86. Between the spacing member 83 and the retainer plate 85 there is a diaphragm 87 which acts as a valve seat for both said valves 62 and 82. The clamping plate 81 has radial passageways 89. The retainer member 85 acts as a support for one end of a large spring 90, the other end of the spring being arranged to seat on the spider 78. Within the spring 90 there is a small spring 91 for normally keeping the valve 62 open and which bears against one end of the bushing 60, the other end of said spring 91 resting against the spider 78. The passageways 89 just referred to are for the purpose of admitting air when the valve 82 is unseated, inasmuch as these passageways communicate with an annular chamber 92 in the casting 52 which leads to a port 93 covered with a gauze disc 94 and communicating in turn with a chamber 95 filled with horsehair, within a cover 96 which is in communication with the outer air around its edge 97 owing to the fact that it is supported upon fingers 98 on the casting 52. This cover 96 is held in place beneath the tube 66 by the nut 67. Passing through the chamber 95 at one point there is an extension 99 on the casting 52 to provide a passageway 100 which extends through the spider 78 into the interior of the housing 39 so as to provide a modified vacuum, if desired, for any other purpose and as an opening for the insertion of a lubricant. This is normally closed by a screw plug 101.

Within the housing 39 and resting against the casting 52 there is a cylinder 102 closed at one end of an annular cap 103 containing an aperture 104. The cap 103 and cylinder 102 are secured to the casting 52 by means of bolts 105 carrying shouldered sleeves 106 for this purpose, the bolts being connected together by an end ring 107. When the manual pressure has accumulated sufficiently to move the plunger 59 the outlet valve 62 will become seated on the diaphragm 87 and then push the inlet valve 82 off its seat to admit the atmospheric air through the spider 78 which, as a result, forces to the right a piston 108, which is mounted on the plunger 63, against a shoulder 109 on said plunger where it is clamped in place by a hollow piston rod 110. The said piston has on one face thereof a thin plate 111 for holding in place a leather piston ring 112 which is kept in contact with the cylinder 102 by a spring ring 113 of any desired shape. The other face of the piston 108 carries a retainer plate 114 for holding in place a felt washer 115. The said piston 108 is normally forced to the left by means of a coil spring 116, the other end of which is supported on the cap 103. The hollow piston 110 has a longitudinal passageway 117 in order to permit the reciprocation of a rod 118 having a head 119 contacting with a constriction 120 in the end of the passageway 117 in the piston rod 110. The other end of the rod 118 is connected to the valve member 21. Furthermore, the said end of the piston rod 110 is brazed to a movable plunger 121 having a rubber seal 121a which in turn is located within a tubular member 121b headed over into the cap 103. The other end of the tubular member 121b is screw-threaded into the casting 16 and is provided with a shoulder 122 to act as a support for a spider 122a supporting a spring 123, the other end of which rests against the valve member 21 to normally seat the valve 19 against the valve seat 18 when permitted by the forward movement of the piston 108.

In the modification of the invention shown in Fig. 6, I have illustrated a mechanically operated part to be moved which may be connected, if desired, to a pipe such as the pipe 23, instead of the brake-band. For this purpose the pipe 23 may lead to a cylinder 124 having a chamber 124a therein adapted to be vented, when desired, by an air bleeder 126 constructed like the air bleeder previously described herein. The cylinder 124 may be connected by ears 127 to any suitable support 128. Within the said cylinder 124 there is a piston 125 which is adapted to actuate a push rod 129 connected by a pivot 130 to a bell crank lever 131 mounted on any desired fixed pivot 132 and having an arm 133 normally pressed upwardly by a spring 134. The arm 133 may be used to operate any desired part to be moved.

Figures 7, 9:
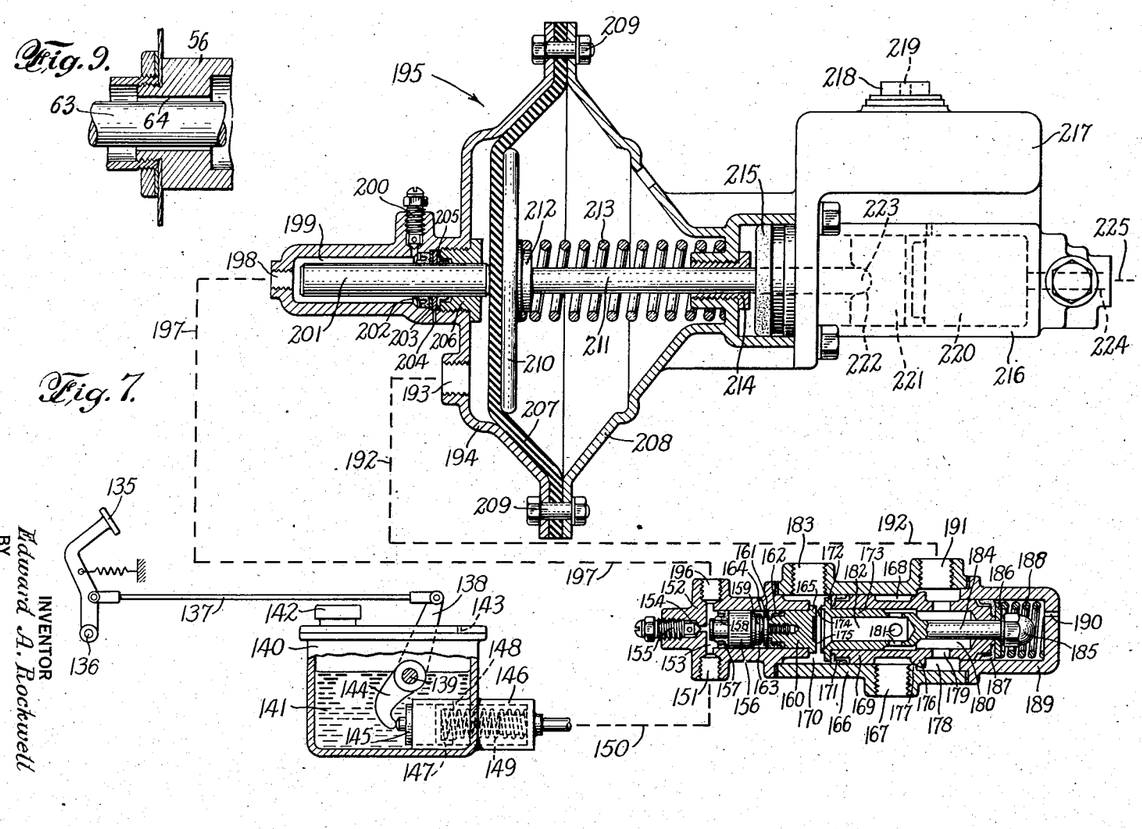
Fig. 7 is a diagrammatic vertical section showing a travel controlled air brake system operated with compressed air.
Fig. 9 is an enlarged cross sectional detail showing the clearance between the monitor plunger and its housing.

In the modification of my invention shown in Fig. 7, the travel controlled features of my invention are applied to the operation of automotive vehicle brake systems involving the use of compressed air. As shown in said figure I have provided a pedal 135 carried by a fixed pivot 136 on the chassis of an automobile (not shown). The pedal 135 is pivotally connected by a link 137 to an operating lever 138 mounted on a shaft 139 extending into a master cylinder 140, which may be of any desired construction, as for example the master cylinder as disclosed in the said Loughead patent. As shown in the drawings, for example, the master cylinder 140 may have the usual reservoir 141 and the usual filling cap 142 as well as the usual vent 143. The shaft 139 which extends into the master cylinder 140, furthermore, may be provided with an operating lever 144 which bears on a piston 145 in a cylinder 146 provided with a piston 147 so placed that in the retracted position thereof it uncovers a compensating port 148. The said piston 147 is retracted by a spring 149. The liquid discharged from the master cylinder 140 is supplied by a pipe 150 to an inlet port 151 which is located in a plunger housing 152 having therein a chamber 153. The chamber 153 can be vented from time to time, as desired, through a passageway 154 leading to an air bleeder screw plug 155 constructed the same as and having the same parts associated therewith as in the case of the air bleeder screw plug 70 previously described herein. Within the chamber 153 there is a plunger 156 having a U-shaped rubber seal 157 carried in an annular recess 158 on the forward part of said plunger. The rear of said plunger 156 has an extension 159 which is arranged to move rearwardly a valve plunger 160 having a screw head 161 thereon holding in place a leather gasket 162. Between the extension 159 and the screw head 161 there is a space 163 which is vented to the outer air through a small port 164. The rear end of the valve plunger 160 has a flange 165 which extends over the end of the plunger housing 152 within a valve casing 166. The said valve housing 156 has an inlet port 167 which is adapted to be connected with any suitable source of compressed air. The compressed air thus admitted is received in an annular chamber 168 on the periphery of a cylindrical valve member 169 located in a cylindrical chamber 170 in the valve casing 166 within which it is sealed by a leather gasket 171 which is located adjacent to a flange 172 on an internal tubular valve member 173 located within the valve member 169. The said internal tubular valve member 173 is, furthermore, provided with an annular valve element 174 which cooperates with a valve seat 175 on the valve plunger 160. Adjacent to the chamber 168 the valve member 169 has located thereon a tapered valve element 176 which cooperates with a valve seat 177 on the valve casing 166. When the conical valve 176 is unseated the compressed air is then admitted to an annular chamber 178 in the casing 166, which in turn admits the air through radial ports 179 in the valve member 169 to a cylindrical chamber 180 in the cylindrical valve member 169 in which chamber the internal valve member 173 is located. The air thus admitted to the chamber 180 can pass through radial openings 181 in the internal tubular valve member 173 to a cylindrical chamber 182 within said member 173 so that when the valve 174, 175 is open the released air can pass out through an exhaust port 183 in the casing 166. It will be noted that the internal tubular valve member 173 has extending rearwardly therefrom a rod 184 which passes through the end of the valve member 169 and is held in place thereon by a nut 185 which, by means of a washer 186, clamps in place a leather gasket 187. A spring 188 rests against the said washer 186 and at the other end rests against the inside of a head 189 secured to the valve casing 166. The head 189 also has a vent 190. The said head 189 and the plunger housing 152 can be secured to the valve casing 166 in any desired way. The compressed air when admitted to the chamber 180, when the valve 174, 175 is in closed position, passes out by an air pressure port 191 by a pipe 192 to an inlet port 193 in a forward shell 194 of a compressed air power unit 195. This supply of compressed air through the pipe 192 will not take place, however, until after sufficient pressure has been exerted through the pipe 150 so as to move the plunger 156, close the valve 174, 175 and open the valve 176, 177. Before the said valves are moved in this way, however, the manual hydraulic pressure will have passed initially from the chamber 153 through an outlet port 196 and thence through a pipe 197 to an inlet port 198 on the forward shell 194 of the power unit 195. The inlet port 198 communicates with a monitor chamber 199 having an air bleeder 200 constructed like the air bleeders previously described herein, and extending into the said chamber there is a monitor plunger 201 which passes through an annular rubber seal 202, a washer 203, adjacent to which there is a venting port 204, and then through a leather washer 205 held in place by a screw-threaded guiding sleeve 206 at the end of the chamber 199. The rear end of the monitor plunger 201 is flat and rests against a flexible diaphragm 207 of any desired material impervious to the air, as for example a laminated oil-treated woven fabric, the said diaphragm being clamped at its periphery between the shell 194 and a rear shell 208 by means of screws 209. Against the rear face of the flexible diaphragm 207 a head 210 rests, which head is carried on a piston rod 211 by being screw-threaded to a recessed ring 212 attached to said head 210. A coil spring 213 requiring less force for its compression than the spring 188 rests at one end against the ring 212 and at the other end against the interior of the shell 208. The piston rod 211 passes out through a screw-threaded bushing 214 and thence through a liquid-tight packing 215 to the interior of a master cylinder 216 having a filling chamber 217 at the upper portion thereof closed by a filling cap 218 having a vent hole 219 therein. Below the chamber 217 there is a cylinder 220 carrying a piston 221 having a recess 222 in which a rounded end 223 of the piston rod 211 rests. The liquid put under pressure in the cylinder 220 passes out of the master cylinder through an outlet port 224 having a pipe 225 connected thereto which leads to the usual wheel brake cylinders (not shown) located on the automobile chassis.

Figure 8:
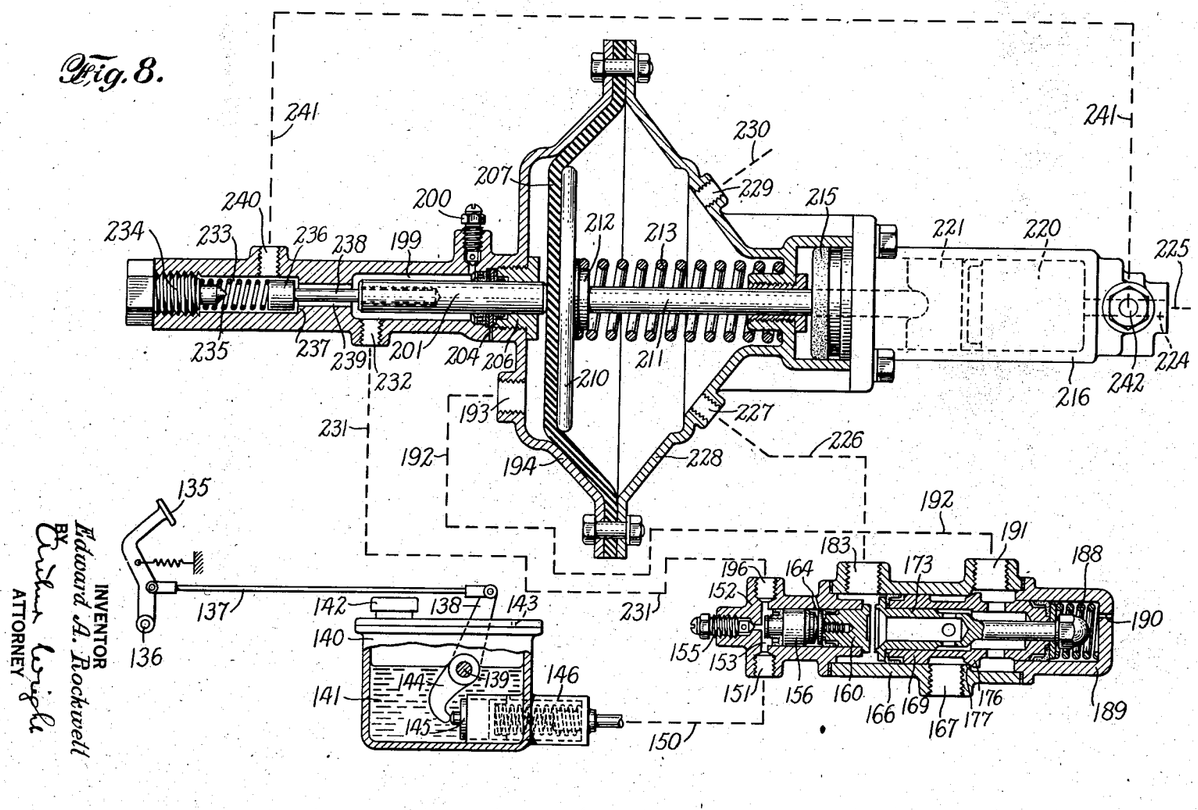
Fig. 8 is a similar view of a modification of the apparatus shown in Fig. 7 when applied to the operation of vacuum controlled brake systems without the utilization of a vacuum power unit such as that shown in Figs. 1 to 5.

In the modification of my invention shown in Fig. 8, the same general structure as described in connection with Fig. 7 is utilized, but instead of using a source of compressed air therein I use a source of vacuum. For this purpose, when using the vacuum I use exactly the same valve mechanism as shown at the lower part of Fig. 7 and connections thereto, except in this instance the inlet opening 167 is connected to the atmospheric air and the port 183 is connected by a pipe 226 to an inlet port 227 on a rear shell 228 of the vacuum power unit, as shown in Fig. 8, which also has an inlet port 229 leading by a pipe 230 to any suitable source of vacuum, as for instance the manifold of the internal combustion engine which operates the automobile on which the brake operating mechanism is mounted. All the remaining parts of the vacuum power unit are constructed the same as in the compressed air embodiment shown in Fig. 7, except when using the vacuum, instead of the pipe 197 leading from the port 196, a pipe 231 leading from said port to an inlet opening 232 which leads to the chamber 199 in the forward shell 194, which has an extension provided with a chamber 233 normally closed by a plug 234. However, in this instance a light spring 235 is provided, resting at one end thereof against the plug 234 and at the other end on a liquid compensating valve head 236 adapted to seat on a shoulder 237 within the said chamber 235. The valve head 236 has a valve stem 238 which extends through an opening 239 and thence into a bore in the plunger 201, said bore being larger in diameter than said stem 238 and acting as a guide for the stem 238. Said extension of the forward shell 194 has a port 240 which is connected by a pipe 241 to a port 242 on the discharge side of the master cylinder 220. Furthermore, in this instance the master cylinder is not provided with the reservoir 217 nor the filling cap 218, the same being unnecessary in view of the pipe 241.

In the operation of the apparatus, referring to Figs. 1 to 5, the movement of the hand lever 1 to one side or the other will operate one or the other of the brake-bands 7 and 8, and as the operation of each of these brake-bands is the same, the operation of only one thereof will be described in detail, for example the brake-band 8, and which may be located on the brake drum (not shown) of a winch used, for instance, in a hoisting engine and which may be driven by an internal combustion engine having a manifold from which vacuum is supplied to the apparatus by the pipe 44. The movement of the master cylinder piston 11 will result in hydraulic liquid under pressure passing through the pipe 13 and thence initially past the valve 18, 19 as the valve 18, 19 is normally withdrawn by the spring 116 due to the valve being held back by the head 119 against the force of the small spring 123. The liquid thus passes by the flutings 20 and thence out through the outlet port 22 and the pipe 23 so as to act on the brake pistons 25 and 26, thus contracting the diameter of the brake-band 8 and, accordingly, applying the brake to the winch. By means of the mechanism made in accordance with my invention, however, not only is the desired modulated pressure applied to the brake pistons 25 and 26 but the travel thereof is coordinated to the travel of the hand lever 1 in the course of the further movement of the pistons 25 and 26 to apply the braking force to the extent desired to the brake drums (not shown). This is accomplished owing to the fact that as a further increase of manual pressure is applied to the liquid passed through the pipe 38 and the pipe 54 to the plunger 58 simultaneously, the outlet valve 61 will be closed and the inlet valve 82 opened so as to admit air to the left face of the piston 108 and thus starting the movement of the same towards the right, in Fig. 3. This will be accomplished at the same time by the movement of the plunger 63 in the chamber 65 so that the extent of travel of the piston 108 will be coordinated substantially exactly to the extent of travel of the hand lever 1, while at the same time applying any desired degree of modulated pressure to the liquid, which is thus discharged by the closing of the valve 18, 19 and the forcing of the liquid trapped in the cylinder 121b out through the pipe 23 to the brake cylinder. In other words, the manual increase of pressure in the pipe 54 increases the pressure in the chamber 58. This results in moving the plunger 59 to the right and consequent closure of the outlet valve 61 followed by opening to the desired degree the inlet valve 82. The air thus admitted through the latter valve exerts a pressure on the piston 108, moving it towards the right. This is accompanied by coordinate movement of the plunger 63 and increase in volume of the chamber 65, which is reflected in a coordinate movement permitted to the hand lever 1 which has been moved to the desired forward position under manual pressure. However, at any one position in which the manual lever 1 is held the degree of the pressure of the air admitted to the right of the diaphragm 80 will subsequently close the valve 82 as the consequent increase of pressure on the right of the diaphragm 87 will move the valve 82 slightly to the left, but additional pressure on the piston 108 can be applied thereto by slight additional pressure as desired on the manual lever 1 to again open and then close the valve 82 in the same way. The reverse movement of the parts will take place in a similar manner but in a reverse order so that as a consequence not only an on-modulation but also an off-modulation may be secured at any time while at the same time the travel of the manual lever is coordinated to the extent of travel of the brake or other part moved thereby. It will be noted, furthermore, that the power unit, which is comprised within the housing 39 and attached enclosures, is operable irrespective of its relative position in regard to the manual operating means and the part to be moved, for example the brake cylinder 24 and parts connected thereto, and that this is accomplished without thrust from the power unit on any support to which it may be connected. In fact, the support, as for instance the straps 46, 47, may be omitted. This enables the apparatus to be set up more quickly as the power unit may be located at any convenient point during the operation of the apparatus.

The operation of the modification shown in Fig. 6 is the same except that this is shown as a cylinder with a single piston, having a bell crank lever connected to the part to be moved and the travel of which and the pressure on which can be simultaneously controlled effectively at all times.

In the operation of the modified form of my invention shown in Fig. 7, the apparatus disclosed therein is designed for the operation of compressed air brakes applied to any desired type of automotive vehicle. In fact this apparatus is also designed so that it may be applied in the operation of present forms of air brake systems carried by automobiles. In the apparatus shown in this figure the manually supplied hydraulic liquid received from the master cylinder enters the port 151 and thence passes into the cylinder 199 having the monitor plunger 201 therein, by the movement of which the brakes may be manually applied by moving the plunger 211, master cylinder piston 221 and, accordingly, the hydraulic liquid supplied through the port 224 passes to the brake cylinders for operating the brakes manually. Due to the monitor plunger 201 the travel of the brakes will be coordinated to the travel of the foot pedal supplying the liquid under manual pressure to the port 151. The manual supply liquid received in the port 151 will close the valve 174, 175 the initial closure of which does not prevent the subsequent application of power by the diaphragm 207 as the further increase of the manual pressure will result in unseating the inlet valve 176 against the opposition of the spring 188, thereby permitting air pressure from the port 167 to pass by the ports 179 out through the port 191 in the form of modulated increments of air pressure so as to move the diaphragm 207, the plunger being maintained in contact therewith, and consequently the master cylinder piston 221 so as to apply the hydraulic pressure through the pipe 225 to the brake cylinders for applying the brakes. Accumulating pressure in the chamber 178 will close the inlet valve 176 when the movement of the piston 147 stops at any given point and thereafter partial or entire release of the manual pressure exerted by the pedal 135 on the liquid supplied to the port 151 will cause the valve 174, 175 to become unseated, thus exhausting the air through the exhaust port 183 and causing the diaphragm 207 to move to the left so as to release the brakes.

In the modification of my invention shown in Fig. 8, the apparatus is designed to be applied to the hydraulic operation of vacuum-operated brake systems, and in fact is applicable to the operation of vacuum brake systems customarily in use on automobiles. This modification of my invention operates similarly to the compressed air-operated embodiment shown in Fig. 7. However, in this instance the port 167 being a vent and the port 183 being a vacuum connection leading to the right side of the diaphragm 207, the port 191 admits modulated amounts of atmospheric air pressure from the pipe 192 to the left side of the diaphragm 207 according to how much of the atmospheric air pressure has been admitted. These modulated amounts of air pressure are determined by the amounts of increasing pressure applied manually to the port 151, after this manually supplied liquid has already been conveyed previously by the pipe 231 to the chamber 199 and thence, when the valve 236 is open, to the chamber 233 so as to apply the manual hydraulic pressure to the brakes through the pipes 241 and 225. When the manual pressure is thus applied through the port 151 and pipe 231 and the atmospheric pressure has been applied through the port 193 on the diaphragm 207, with the resultant movement of the plunger 201 to the right, which remains in contact with the diaphragm 207, the valve head 236 becomes seated so as to cut off further access of the liquid from the pipe 231 to the chamber 233 and thereafter the manual pressure received through the pipe 231 will act merely to move the plunger 201 to keep it in contact with the diaphragm 207, while the atmospheric air pressure on the diaphragm 207 acts to convey the pressure to the pipe 225 leading to the brakes. However, relaxation of said manual pressure through the pipe 231 will again result in the valve head 236 being forced off its seat by the retraction of the monitor plunger 201 under the influence of the spring 213 thus releasing the brakes.

While I have described my invention above in detail I wish it to be understood that many changes may be made therein without departing from the spirit of the same.

I claim:

1. In an apparatus of the character described, an enclosed wall adapted to be moved by a gaseous medium, a plunger and a cylinder connected thereto, a work-performing part adapted to be moved thereby, a control means therefor, a valve apparatus having a pressure responsive means controlled by said means adapted to control the movement of said wall in one direction, and means for urging said wall in the opposite direction, said control means comprising a master cylinder, a hydraulic conduit leading therefrom directly to said part conveying liquid under pressure to actuate the latter, and a fluid controlling device, including a second separate different cylinder in communication with the pressure responsive device and having a conduit leading to the master cylinder and plunger means therein on the other side of the wall from the first mentioned plunger, connected to the movable wall, constructed to have movement with said wall and constructed so as to coordinate the movement of the wall and control means and to operate as a result of the movement of said valve apparatus.

2. In an apparatus of the character described, an enclosed wall adapted to be moved therein, a work-performing part adapted to be moved thereby, a control means therefor, a valve apparatus having a pressure responsive means controlled by said means adapted to control the movement of said wall in one direction, and means for urging said wall in the opposite direction, said control means comprising a master cylinder, a hydraulic conduit leading therefrom directly to said part conveying liquid under pressure to actuate the latter, and a fluid controlling device, including a cylinder in communication with the pressure-responsive device and having a conduit leading to the master cylinder and plunger means therein on the other side of the wall from the hereinafter mentioned pressure increasing plunger, connected to the movable wall, constructed to have movement with said wall and constructed so as to coordinate the movement of the wall and control means and to operate as a result of the movement of said valve apparatus, said wall having a pressure-increasing plunger connected thereto, provided with a second separate different cylinder.

3. In an apparatus of the character described, an enclosed wall adapted to be moved therein, a source of pressure for moving the same, a part for performing work moved thereby, a control means therefor comprising a conduit conveying liquid under pressure from the control means directly to move said part, a valve apparatus controlled by said means constructed to control the movement of said wall by said source of pressure in one direction, and means for urging said wall in the opposite direction, said control means further comprising a fluid controlling device, having a plunger, connected to the movable wall and a passageway leading to the control means, constructed so as to coordinate the movement of the wall and control means, said wall having a pressure-increasing plunger connected thereto and a cylinder therefor, said device comprising a cylinder for said first mentioned plunger and said valve apparatus comprising a valve-actuating plunger in the last mentioned cylinder for bringing about the movement of said movable wall by said source of pressure.

4. In an apparatus of the character described, an enclosed wall adapted to be moved therein, a work-performing part adapted to be moved thereby, a control means therefor, a valve apparatus controlled by said means, constructed to control the movement of said wall in one direction, and means for urging said wall in the opposite direction, said control means comprising a master cylinder, a hydraulic conduit therefrom to said part, constructed so as to convey pressure to actuate the latter, and a fluid controlling device connected to the movable wall and having in communication therewith a conduit leading to the master cylinder, constructed so as to coordinate the movement of the wall and control means, said device comprising a plunger and a cylinder for the plunger, and said control means further comprising an annular plunger connected to said valve apparatus located around the plunger of said device.

5. In an apparatus of the character described, an enclosed wall adapted to be moved therein, a work-performing part adapted to be moved thereby, a control means therefor, a valve apparatus controlled by said means adapted to control the movement of said wall in one direction, and means for urging said wall in the opposite direction, said control means comprising a master cylinder, a hydraulic conduit therefrom to said part, constructed to convey pressure to actuate the latter, and a fluid controlling device connected to the movable wall and having a conduit leading to the master cylinder, constructed so as to coordinate the movement of the wall and control means, said wall having a pressure-increasing device connected thereto, said device comprising a plunger and a cylinder for the plunger, and said control means further comprising an annular plunger connected to said valve apparatus located around the plunger of said device.

6. In an apparatus of the character described, an enclosed wall adapted to be moved therein, a part adapted to be operated hydraulically by the movement of said wall, a manually operable hydraulic control means for moving said wall, including a master cylinder, a hydraulic conduit therefrom to said part, conveying liquid under pressure to actuate the latter, a valve apparatus having a pressure-responsive means controlled by said manual means adapted to control the movement of said wall in one direction, means for urging said wall in the opposite direction, and a fluid controlling device including a cylinder in communication with the pressure responsive device and having a conduit leading to the master cylinder and plunger means therein on the other side of the wall from the hereinafter mentioned pressure-increasing plunger, connected to the movable wall, constructed to have movement with the wall, controlled by said control means and constructed so as to coordinate the movement of the wall and control means and to operate as a result of the movement of said valve apparatus, said wall having a pressure-increasing plunger, provided with a second separate different cylinder, said pressure-increasing plunger being attached to the plunger of said device.

7. In combination, an enclosed wall adapted to be moved, a part adapted to be operated hydraulically by the movement of said wall, a manually operable hydraulic control means for moving said wall, a valve operatively connected to the wall constructed when open to initially apply by the manually operable means manual hydraulic pressure to said part and when closed to interrupt said application of the manual hydraulic pressure, a valve apparatus controlled by said manual means constructed to control the movement of said wall in one direction, means for urging said wall in the opposite direction, and a fluid controlling device having two plungers, one connected to the movable wall to be moved thereby and the other connected to the valve apparatus to operate said apparatus and including a cylinder connected by a passageway to said control means constructed so as to coordinate the movement of the wall and control means, said wall having a pressure-increasing plunger provided with another separate different cylinder attached to the plunger of said device which is connected to the movable wall and having a lost-motion connection with said valve.

8. In combination, a master cylinder, a part adapted to be moved by the liquid from the master cylinder for work-performing action, and a power unit connected to the master cylinder, said power unit having a source of vacuum, a conduit connection from the master cylinder conveying operating liquid to move said part directly from the master cylinder without power from the power unit, a plunger having a hydraulic connection to said part adapted to be operated by the vacuum for applying power hydraulically from the plunger to said part, a cylinder for said plunger, a valve means, having a pressure-responsive means, operated from the master cylinder for controlling the application of said vacuum, a wall adapted to be moved under the influence of said vacuum controlled by the valve means, and a second separate different plunger cylinder having movable means therein on the other side of the wall from the first mentioned plunger, said movable means being mechanically connected to the wall so as to move as a result of the movement of said valve and to move substantially in accordance with said first-mentioned plunger and movable wall a communication between the pressure-responsive means and the second plunger cylinder, said movable means being adapted to be operated from the master cylinder by control of the operation of the movable wall.

9. In combination, a master cylinder, a part adapted to be moved by the liquid from the master cylinder for work-performing action, and a power unit connected to the master cylinder, said power unit having a source of vacuum, a conduit connection from the power unit for operating said part directly from the master cylinder without the power from the power unit, a plunger adapted to be operated by the vacuum for applying power for the movement of said part, a cylinder for said plunger, a valve means operated from the master cylinder for controlling the application of said vacuum, a wall adapted to be moved under the influence of said vacuum controlled by the valve means, a second plunger, provided with a cylinder, connected to said first-mentioned plunger and movable wall adapted to be operated as a result of the operation of the master cylinder for control of the operation of the movable wall, and an annular plunger, provided with a cylinder, operated hydraulically from the master cylinder located around the second-mentioned plunger for controlling the operation of said valve means.

10. In combination, a master cylinder, a part adapted to be moved by the liquid from the master cylinder for work-performing action, and a power unit connected to the master cylinder, said power unit having a source of vacuum, a conduit connection from the master cylinder conveying operating liquid to move said part directly from the master cylinder without the power from the power unit, a plunger having a hydraulic connection to said part adapted to be operated by the vacuum for applying power hydraulically from the plunger to said part, a cylinder for said plunger, a valve means, having a pressure-responsive means, operated from the master cylinder for controlling the application of said vacuum, a wall adapted to be moved under the influence of said vacuum controlled by the valve means, a second separate different plunger cylinder having movable means therein on the other side of the wall from the first mentioned plunger, said movable means being mechanically connected to the wall so as to move as a result of the movement of said valve and to move substantially in accordance with said first-mentioned plunger and movable wall a communication between the pressure-responsive means and the second plunger cylinder, said movable means being adapted to be operated from the master cylinder by control of the operation of the movable wall, and a hydraulic valve connected to said first-mentioned plunger and adapted to disconnect the delivery from the master cylinder to said part when the first-mentioned plunger has moved into action.

11. In combination, a master cylinder, a part adapted to be moved by the liquid from the master cylinder for work-performing action, and a power unit connected to the master cylinder, said power unit having a source of vacuum, a conduit connection from the power unit for operating said part directly from the master cylinder without the power from the power unit, a plunger adapted to be operated by the vacuum for applying power for the movement of said part, a cylinder for said plunger, a valve means operated from the master cylinder for controlling the application of said vacuum, a wall adapted to be moved under the influence of said vacuum controlled by the valve means, a second plunger, provided with a cylinder, connected to said first-mentioned plunger and movable wall adapted to be operated as a result of the operation of the master cylinder for control of the operation of the movable wall, an annular plunger, provided with a cylinder operated hydraulically from the master cylinder located around the second-mentioned plunger for controlling the operation of said valve means, and a hydraulic valve connected to said first-mentioned plunger and adapted to disconnect the delivery from the master cylinder to said part when the first mentioned plunger has moved into action.

12. In combination, a master cylinder, a part adapted to be moved by the liquid from the master cylinder for work-performing action, and a power unit connected to the master cylinder, said power unit having a source of vacuum, a conduit connection from the master cylinder conveying operating liquid to move said part directly from the master cylinder without the power from the power unit, a plunger adapted to be operated by the vacuum for applying power for the movement of said part, a cylinder for said plunger, a valve means operated from the master cylinder for controlling the application of said vacuum, a wall, in a cylinder, adapted to be moved under the influence of said vacuum controlled by the valve means, and a second plunger cylinder having movable means therein, said movable means being mechanically connected to the wall so as to move as a result of the movement of said valve and to move substantially in accordance with said first-mentioned plunger and movable wall, said movable means being adapted to be operated from the master cylinder by control of the operation of the movable wall, said power unit comprising also an enclosure, for the movable wall and its cylinder, containing the said vacuum and a cylindrical extension chamber attached to said enclosure and forming the second plunger cylinder in which said second-mentioned plunger operates.

13. In combination, a master cylinder, a part adapted to be moved by the liquid from the master cylinder for work-performing action, and a power unit connected to the master cylinder, said power unit having a source of vacuum, a conduit connection from the power unit for operating said part directly from the master cylinder without the power from the power unit, a plunger adapted to be operated by the vacuum for applying power for the movement of said part, a cylinder for said plunger, a valve means operated from the master cylinder for controlling the application of said vacuum, a wall adapted to be moved under the influence of said vacuum controlled by the valve means, a second plunger, provided with a cylinder, connected to said first-mentioned plunger and movable wall adapted to be operated as a result of the operation of the master cylinder for control of the operation of the movable wall, and an annular plunger, provided with a cylinder, operated hydraulically from the master cylinder located around the second-mentioned plunger for controlling the operation of said valve means, said power unit comprising also an enclosure, for the first-mentioned cylinder and movable wall, containing the said vacuum and a cylindrical extension chamber attached to said enclosure in which said second-mentioned plunger operates.

14. In combination, a master cylinder, a part adapted to be moved by the liquid from the master cylinder for work-performing action, and a power unit connected to the master cylinder, said power unit having a source of vacuum, a conduit connection from master cylinder conveying operating liquid to move said part directly from the master cylinder without the power from the power unit, a plunger adapted to be operated by the vacuum for applying power for the movement of said part, a cylinder for said plunger, a valve means operated from the master cylinder for controlling the application of said vacuum, a wall, in a cylinder, adapted to be moved under the influence of said vacuum controlled by the valve means, a second plunger cylinder having movable means therein, said movable means being mechanically connected to the wall so as to move as a result of the movement of said valve and to move substantially in accordance with said first-mentioned plunger and movable wall, and a hydraulic valve connected to said first-mentioned plunger and adapted to disconnect the delivery from the master cylinder to said part when the first-mentioned plunger has moved into action, said power unit comprising also an enclosure, for the movable wall and its cylinder, containing the said vacuum and a cylindrical extension chamber attached to said enclosure and forming the second plunger cylinder in which said second-mentioned plunger operates.

15. In combination, a master cylinder, a part adapted to be moved by the liquid from the master cylinder for work-performing action, and a power unit connected to the master cylinder, said power unit having a source of vacuum, a conduit connection from the power unit for operating said part directly from the master cylinder without the power from the power unit, a plunger adapted to be operated by the vacuum for applying power for the movement of said part, a cylinder for said plunger, a valve means operated from the master cylinder for controlling the application of said vacuum, a wall adapted to be moved under the influence of said vacuum controlled by the valve means, a second plunger, provided with a cylinder, connected to said first-mentioned plunger and movable wall adapted to be operated as a result of the operation of the master cylinder for control of the operation of the movable wall, an annular plunger, provided with a cylinder, operated hydraulically from the master cylinder located around the second-mentioned plunger for controlling the operation of said valve means, and a hydraulic valve connected to said first-mentioned plunger and adapted to disconnect the delivery from the master cylinder to said part when the first mentioned plunger has moved into action, said power unit comprising also an enclosure, for the first-mentioned cylinder and movable wall, containing the said vacuum and a cylindrical extension chamber attached to said enclosure in which said second-mentioned plunger operates.

16. In an apparatus of the character described, an enclosed wall adapted to be moved by a gaseous medium, a work-performing part adapted to be moved thereby, a hydraulic control means therefor, a valve apparatus having a pressure-responsive means, including a source of vacuum, an outlet valve and an air inlet valve, controlled by said means adapted to control the movement of said wall in one direction, and means for urging said wall in the opposite direction, said control means comprising a master cylinder, a hydraulic conduit leading therefrom to actuate said part, constructed to convey pressure to actuate the latter, and a fluid controlling plunger connected to the movable wall, constructed to have movement with said wall and a cylinder for said plunger having a fluid connection to said pressure-responsive means and with the control means to coordinate the movement of the wall and control means, said plunger, passing through one of said valves.

17. In an apparatus of the character described, an enclosed wall adapted to be moved by a gaseous medium, a part having liquid compensating hydraulic connections adapted to be moved by said wall, a hydraulic control means therefor, a valve apparatus having a pressure-responsive means, including a source of vacuum, an outlet valve and an air inlet valve, controlled by said means, constructed to control the movement of said wall in one direction, and means for urging said wall in the opposite direction, said control means comprising a master cylinder, a hydraulic conduit leading therefrom to actuate said part, constructed to convey pressure to actuate the latter, and a fluid controlling plunger connected to the movable wall and a cylinder for said plunger having a fluid connection to said pressure-responsive means and the control means, constructed so as to coordinate the movement of the wall and control means, said plunger passing through both of said valves.

18. In an apparatus of the character described, an enclosed wall adapted to be moved by a gaseous medium, a work-performing part adapted to be moved thereby, a hydraulic control means therefor, a valve apparatus having a pressure-responsive means, including a source of vacuum, an outlet valve and an air inlet valve, controlled by said means, constructed to control the movement of said wall in one direction, and means for urging said wall in the opposite direction, said control means comprising a master cylinder, a hydraulic conduit therefrom to said part, constructed to convey pressure to actuate the latter, and a fluid controlling plunger connected to the movable wall and a cylinder for said plunger having a fluid connection to said pressure-responsive means and the control means, constructed so as to coordinate the movement of the wall and control means, said plunger passing through one of said valves, said wall having a pressure increasing plunger connected thereto and to said first mentioned plunger.

19. In an apparatus of the character described, an enclosed wall adapted to be moved by a gaseous medium, a part having liquid conmpensating hydraulic connections adapted to be moved by said wall, a hydraulic control means therefrom, a valve apparatus, including a source of vacuum, an outlet valve and an air inlet valve, controlled by said means, constructed to control the movement of said wall in one direction, and means for urging said wall in the opposite direction, said control means comprising a master cylinder, a hydraulic conduit therefrom to said part, constructed to convey pressure to actuate the latter, and a fluid controlling plunger connected to the movable wall and a cylinder for said plunger having a fluid connection to said pressure-responsive means and the control means, constructed so as to coordinate the movement of the wall and control means said plunger passing through both of said valves, said wall having a pressure-increasing plunger connected thereto and to said first mentioned plunger.

EDWARD A. ROCKWELL.